(12) United States Patent
Stelling Neto et al.

(10) Patent No.: US 12,493,503 B2
(45) Date of Patent: Dec. 9, 2025

(54) HYPERCUBE TOPOLOGY FOR BYZANTINE FAULT TOLERANT SOLUTIONS TO REDUCE NETWORK COMMUNICATION OVERHEAD OF PBFT-BASED PROTOCOLS

(71) Applicant: Dell Products L.P., Round Rock, TX (US)

(72) Inventors: Roberto Nery Stelling Neto, Rio de Janeiro (BR); Victor da Cruz Ferreira, Rio de Janeiro (BR); Joubert de Castro Lima, Cataguases (BR); Vinicius Facco Rodrigues, São Paulo (BR); Vicente J. P. Amorim, João Monlevade (BR); Werner Spolidoro Freund, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 8 days.

(21) Appl. No.: 18/638,597

(22) Filed: Apr. 17, 2024

(65) Prior Publication Data
US 2025/0328402 A1    Oct. 23, 2025

(51) Int. Cl.
*G06F 11/00* (2006.01)
*G06F 11/07* (2006.01)

(52) U.S. Cl.
CPC ........ *G06F 11/004* (2013.01); *G06F 11/0709* (2013.01)

(58) Field of Classification Search
CPC .................................................. G06F 11/004
See application file for complete search history.

(56) References Cited

U.S. PATENT DOCUMENTS

| | | | | |
|---|---|---|---|---|
| 5,280,607 | A | * | 1/1994 | Bruck ................. G06F 11/2051 714/4.1 |
| 2020/0117657 | A1 | * | 4/2020 | Xie ........................ G06Q 20/02 |
| 2020/0403776 | A1 | * | 12/2020 | Oh ......................... H04L 9/3247 |
| 2024/0137208 | A1 | * | 4/2024 | Zhu ......................... G06Q 20/40 |

OTHER PUBLICATIONS

Q. Zhang, J. Su, Z. Ma, Y. Zhang, J. Yang and J. Zhan, "Blockchain Model Testing and Implementation Based on Improved PBFT Consensus" (Year: 2021).*

(Continued)

*Primary Examiner* — Bryce P Bonzo
*Assistant Examiner* — Gabriella Kanani Shelton
(74) *Attorney, Agent, or Firm* — Workman Nydegger

(57) ABSTRACT

One example method includes receiving, by each node in a group of nodes that is organized in a logical hypercube topology, a message from a primary node that is a member of the group of nodes. When none of the nodes in the group of nodes are faulty, for each of 'n' prepare phases and 'n' commit phases of a communication protocol, transmitting, by each node to only a first respective pair node, a first group of one or more messages accumulated by the node, receiving, by each node from only a second respective pair node, a second group of one or more messages accumulated by the second respective pair node and, after the 'n' prepare phases and 'n' commit phases have been completed, each of the nodes has accumulated at least a minimum number of total messages to declare consensus.

20 Claims, 12 Drawing Sheets

(56) References Cited

OTHER PUBLICATIONS

Castro, Miguel, and Barbara Liskov. "Practical byzantine fault tolerance." OsDI.vol. 99. No. 1999. 1999.

Mills, David, J. Burbank, and W. Kasch. "RFC 5905: Network time protocol version 4: Protocol and algorithms specification." (2010).

Mizrahi, T., 2014. Security requirements of time protocols in packet switched networks (No. rfc7384).

Canakci, B. and Van Renesse, R., 2021. Scaling membership of Byzantine consensus. ACM Transactions on Computer Systems (TOCS), 38(3-4), pp. 1-31.

Hao, Xu, et al. "Dynamic practical byzantine fault tolerance." 2018 IEEE conference on communications and network security (CNS). IEEE, 2018.

Jiang, Yanjun, and Zhuang Lian. "High performance and scalable byzantine fault tolerance." 2019 IEEE 3rd information technology, networking, electronic and automation control conference (ITNEC). IEEE, 2019.

Gueta, Guy Golan, et al. "Sbft: a scalable and decentralized trust infrastructure." 2019 49th Annual IEEE/IFIP international conference on dependable systems and networks (DSN). IEEE, 2019.

Pease, M., Shostak, R. and Lamport, L., 1980. Reaching agreement in the presence of faults. Journal of the ACM (JACM), 27(2), pp. 228-234.

Nakamoto, S., 2008. Bitcoin: A peer-to-peer electronic cash system. Decentralized business review, p. 21260.

King, S. and Nadal, S., 2012. Ppcoin: Peer-to-peer crypto-currency with proof-of-stake. self-published paper, August, 19(1).

Utility U.S. Appl. No. 18/483,458, filed Oct. 9, 2023, Network Topology Oriented Byzantine Fault Tolerant System.

* cited by examiner

```
Getting all messages for the first phase my_node = get_node_number(R)
my_payload = {previous_payload, 'my decision'}

# The minimum # of messages necessary to proceed
minimum = f * 2 + 1

# For the first Hamming Channel Hypercube phase
# we could get Hc(1)
current_hamming_channel = get_current_hamming_channel()
for each j in current_hamming_channel

# Compute my pair based on the current
    # Hamming Channel phase
    # Inversely, my pair will compute my node
    pair = my_node XOR j
    send_payload(pair, my_payload)

if not timeout(payload=receive_payload(pair))
        update_payload(payload, my_payload)

# Executed only in the presence of faulty replicas,
# by the nodes that didn't meet the minimum
if number_of_messages(my_payload) < minimum
    current_hamming_channel = get_next_hamming_channel()
    request_post_phase(current_hamming_channel)
```

FIG. 9

```
Incomplete node requesting post-phase for each current_hamming_channel = get_next_hamming_channel()
    for each j in current_hamming_channel
        pair = my_node XOR j

# Only asks for pair's payload
        send_request(pair)

if not timeout(payload=receive_payload(pair))
            update_payload(payload, my_payload)

if number_of_messages(my_payload) >= minimum
            finish
```

FIG. 12

HYPERCUBE TOPOLOGY FOR BYZANTINE FAULT TOLERANT SOLUTIONS TO REDUCE NETWORK COMMUNICATION OVERHEAD OF PBFT-BASED PROTOCOLS

COPYRIGHT AND MASK WORK NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

TECHNOLOGICAL FIELD OF THE DISCLOSURE

Embodiments presented in this disclosure generally relate to the use of Byzantine Fault Tolerant (BFT) protocols in communication networks. More particularly, at least some embodiments relate to systems, hardware, software, computer-readable media, and methods, for reducing the communication overhead imposed by the use of BFT protocols.

BACKGROUND

The growing demand for highly scalable technological infrastructure has raised security, reliability and scalability concerns which led many companies to shift their priorities to provide safer and more reliable environments. With that in mind, Byzantine Fault Tolerant (BFT) protocols play an important role in maintaining system coherence and reliability in the presence of Byzantine faults. BFT requirements are typically present in any area where consensus and fault tolerance are important. For example, the Network Time Protocol (NTPv4) and time protocols in general in packet switched networks have explicit Byzantine requirements, furthermore Byzantine implementations can allow systems to continue to work correctly even when there are software errors. A natural way to increase reliability is to add and replicate nodes in a system, however, increasing the number of nodes in any BFT system exponentially increases BFT protocol communication overhead.

Several BFT protocols are built on top of the original Practical BFT (pBFT) protocol, including those used today in some business blockchains. BFT protocols are usually divided into clear phases to reach consensus and consistently agree on decisions despite the presence of failure or malicious nodes in the system. Currently, state-of-the-art BFT consensus protocols suffer from a major problem that decreases their performance, namely, that pBFT-based protocols require multiple all-to-all message broadcast phases which implies a communication complexity of $O(n^2)$, where n is the number of nodes in the system.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of its scope, example embodiments will be described and explained with additional specificity and detail through the use of the accompanying drawings.

FIG. 9 discloses example pseudocode of first Hamming channel phases in each node, according to one embodiment.

FIG. 12 discloses example pseudocode for post-phase request and response, according to one embodiment.

DETAILED DESCRIPTION OF SOME EXAMPLE EMBODIMENTS

Figure 1:
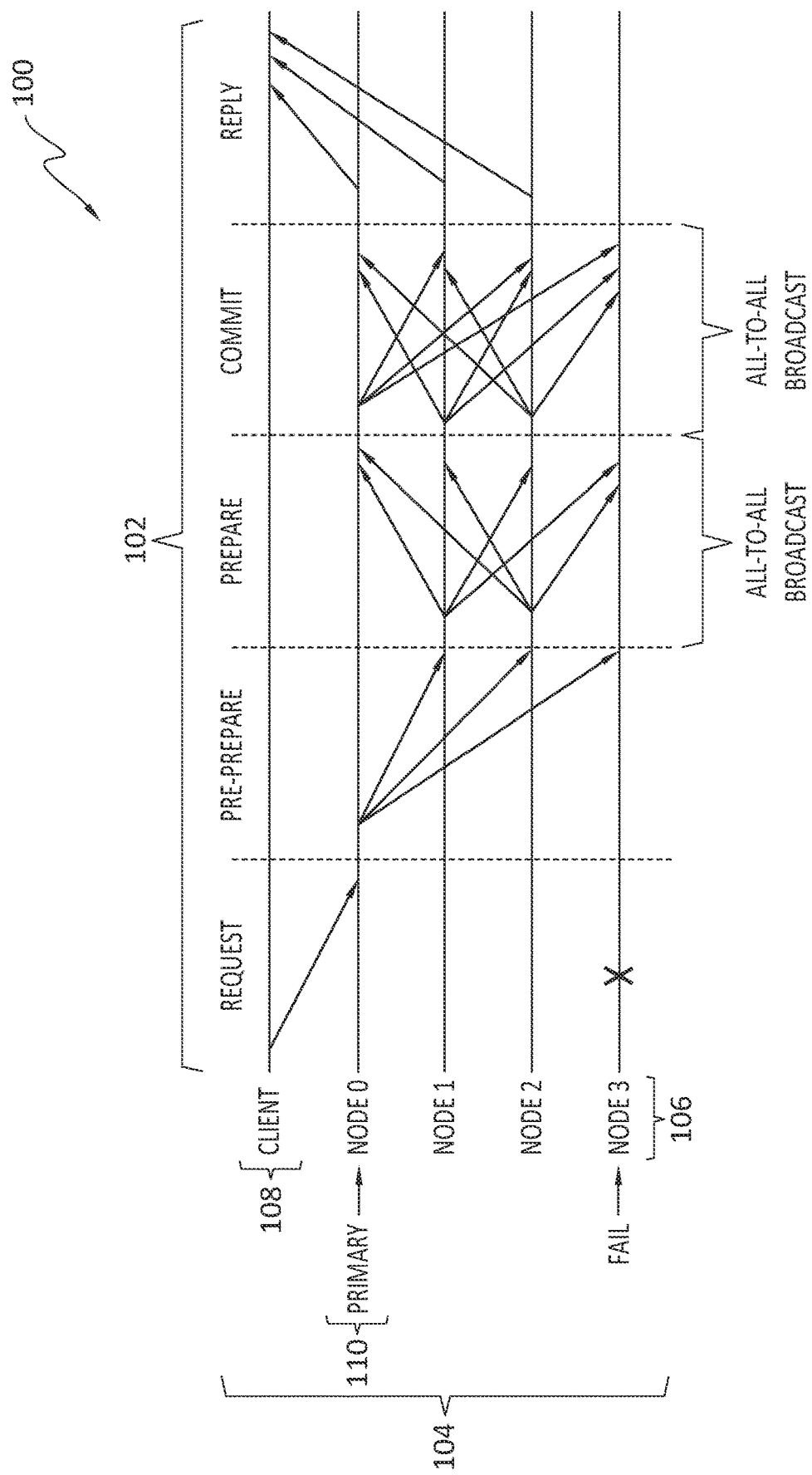
FIG. 1 discloses an example of the pBFT communication protocol with four nodes and one faulty node in the system.

Embodiments presented in this disclosure generally relate to the use of Byzantine Fault Tolerant (BFT) protocols in communication networks. More particularly, at least some embodiments relate to systems, hardware, software, computer-readable media, and methods, for reducing the communication overhead imposed by the use of BFT protocols.

One example embodiment comprises a method that may reduce communication complexity of a pBFT-based protocol. For example, a conventional pBFT-based protocol implemented in a network that has no faulty nodes may have a communication complexity of $O(n^2)$ since it relies on all-to-all broadcast in each phase. By way of contrast, an example embodiment may comprise a method that provides a communication complexity of only $O(n*\log_2 n)$ in that same network.

One example of such a method may comprise operations including: receiving, by each node of a group of nodes a message from a primary node that is a member of the group of nodes—in an embodiment, the message may indicate a request by a client that the nodes attempt to produce a consensus as to some action to be taken with respect to the communication network; transmitting, by each of the nodes, a message to a respective first pair node; receiving, by each of the nodes, a message from a respective second pair node; determining whether each of the nodes has received a minimum number of messages needed for the consensus; when the nodes have each received the minimum number of messages, declaring, by the nodes a consensus by transmitting respective replies to the client; and, when there are one or more node(s) lacking the minimum number of messages needed for consensus, initiating, by those node(s) a post-phase process 1312 that is performed iteratively until the check reveals that the node, or those nodes, have accumulated the minimum number of messages needed for consensus, at which point the nodes that performed the post-phase may transmit their respective replies to the client, indicating that they have the minimum number of messages.

Embodiments, such as the examples disclosed herein, may be beneficial in a variety of respects. For example, and as will be apparent from the present disclosure, one or more embodiments may provide one or more advantageous and unexpected effects, in any combination, some examples of which are set forth below. It should be noted that such effects are neither intended, nor should be construed, to limit the scope of this disclosure or claims in any way. It should further be noted that nothing herein should be construed as constituting an essential or indispensable element of any claim or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that the message complexity of a pBFT-based protocol implemented in a network may be reduced significantly below the message complexity that would be implied in a conventional implementation of a pBFT-based protocol. Various other advantages of one or more example embodiments will be apparent from this disclosure.

A. Context for an Example Embodiment

A.1 Introduction

Current state-of-the-art BFT literature contains different protocols for consensus in distributed systems. The pBFT initially introduced the three-phase protocol to achieve consensus among distributed nodes. However, the pBFT has an $O(n^2)$ communication complexity since it relies on all-to-all broadcast in each phase. Other pBFT-based protocols, such as Dynamic pBFT, High Performance BFT, and Scalable pBFT, have been proposed, focusing on different system characteristics, but they still fall in the same communication complexity, thus having the same problem.

The hypercube is one example network topology that may be used to reduce communication complexity of BFT protocols like pBFT. The hypercube approach does not consider a gradual increase of the number of communications when faulty nodes are part of the committees or quorums. Instead, the well-known all-to-all broadcasts are used in the presence of failures, that is, node failures. Moreover, when the hypercube is imbalanced, the extra nodes try to form a virtual hypercube where all its nodes communicate with all non-virtual cube nodes, thus, the negative impact in terms of communications is huge. In an embodiment however, the use of a Hamming channels concept attenuates both of these problems.

It is noted that asynchronous BFT are inspired by pBFT and, as such, the asynchronous BFT still have all-to-all broadcast phases with complexity $O(n^2)$. On the other hand, an embodiment may improve existing speculative alternatives because the Hamming distance channel concept enables gradual increase of the number of communications in presence of faulty nodes. The asynchronous BFT protocols may also employ an embodiment in the same way that other pBFT-based solutions do, since the hypercube topology with Hamming distance channels approach according to one embodiment works at a network layer, and not at a BFT protocol layer.

In addition to the permissioned consensus protocols, Proof-of-Work (PoW) and Proof-of-Stake (PoS) are commonly employed mechanisms for consensus in permissionless blockchains, allowing the joining, and exiting, of nodes dynamically. However, PoW mechanisms require high computational power, resulting in high energy consumption to add new blocks to the blockchain. Further, PoS protocols can suffer from lack of centralization and unbalanced power dynamics, since nodes are chosen to validate new blocks according to the amount they stake in the network.

A.2 Byzantine Faults

The problem of Byzantine faults and how to solve them in distributed systems were first formulated in 1980. At that time, it was demonstrated that in a set of n nodes, the constraint of n≥3f+1 holds, where f is the number of malicious or faulty nodes.

A.2.1 Practical BFT (pBFT)

The BFT protocol 100 is composed of five phases 102, as shown in FIG. 1. Phases 'Prepare' and 'Commit' are the most communication intensive, requiring an all-to-all broadcast each, that is, all functioning nodes in the network broadcast to all nodes of the network. This implies a communication complexity of $O(n^2)$ for each phase. In the specific example of FIG. 1, the pBFT communication protocol 100 is indicated with four total nodes 104 in the system, one of which is a faulty node 106. The faulty node 106 may be unable to communicate for some reason, that is, while the faulty node 106 may be able to receive broadcasts from the other nodes 104, the faulty node 106 may be unable to respond to those broadcasts, or to perform its own broadcasts.

In pBFT, a client 108 starts the protocol by requesting a validation or some operation that requires a consensus by the system. The nodes 104 include a primary node 110 that is responsible for receiving the client request and starting three phases called 'Pre-prepare,' 'Prepare,' and 'Commit.'

In the 'Pre-prepare' phase, the primary node 110 generates a new view and submits transactions associated with it in a message via broadcast. All messages exchanged in all pBFT phases are cryptographically signed. Once a non-primary node, such as Node 1 or Node 2 for example, accepts the 'Pre-prepare' message, that non-primary node then enters the 'Prepare' phase and broadcasts a signed 'Prepare' message to all the nodes in the view. If a node 104 receives 2f different 'Prepare' messages which match its accepted 'Pre-prepare' message, that node 104 can start the 'Commit' phase. In the 'Commit' phase, if a node 104 receives 2f+1 different commit messages matching its accepted 'Pre-prepare' and 'Prepare' messages, that node 104 commits the transactions and replies to the client 108. The transactions are considered correct when the client 108 receives f+1 identical results or responses from different nodes in the same view defined by the primary node. Recall that f is the number of malicious or faulty nodes.

Finally, as shown in the example of FIG. 1, the client receives a total of 3 replies, that is, 2 f+1. Further, it can also be seen that consistent with the all-to-all communication mode of conventional approaches, the primary node 110 broadcasts to all nodes, and Node 1 and Node 2 broadcast to all nodes. Node 3 is faulty, and thus does not broadcast, although it receives the broadcasts from the primary node 110, Node 1, and Node 2.

It is noted that in the pBFT lexicon, the term 'view' has a particular meaning. Namely, "The replicas move through a succession of configurations called views. In a view, one replica is the primary and the others are backups. Views are numbered consecutively. The primary of a view is replica p such that p=v mod |R|, where v is the view number. View changes are carried out when it appears that the primary has failed."

A.2.2 2D Mesh BFT

One example embodiment formalizes a generic topology definition via Hamming channels and improve communication complexity further. The Hamming channel concept enables the modeling of more complex topologies, besides the original 2D mesh, and a gradual increment of the number of communications when a node cannot reach a consensus via post-phase. Therefore, an embodiment may enhance communication, that is, reduce the communication overhead, for cases without failure to $O(n^*\log_2 n)$ and a post-phase that almost never reaches the worst-case complexity.

B. Aspects of an Example Embodiment

With this problem in mind, an embodiment comprises a modification to BFT protocol phases by taking advantage of a hypercube network topology. Additionally, an embodiment comprises a multi-stage communication channel switch, based on Hamming distances, that allows for a gradual increase of communication usage in case of attacks, faulty nodes, or incomplete hypercubes.

B.1 Overview

In more detail, an embodiment comprises a modification for each all-to-all broadcast phase of pBFT-based protocols by taking advantage of a hypercube network topology and Hamming distance channels. The hypercube network topology changes the all-to-all broadcast phases of pBFT-based protocols to new one-to-one phases. In normal operation, a method according to one embodiment starts with a sequence of one-to-one communication phases at Hamming distance 1, where each node communicates with a pairing node one bit away from itself, in sequence, from the least significant bit to the most significant bit. For n nodes, nodes are numbered from 0 to n−1.

In the presence of faulty nodes, this method uses additional Hamming distance channels communication phases until all nodes achieve consensus. The same strategy can be used preemptively in systems with incomplete number of nodes, with number of nodes not in the form $2^p$, where p is an integer, without resorting directly to all-to-all message broadcast.

Initially, there will be one phase for each axis of the hypercube dimension, meaning that a 4D hypercube will have, in normal conditions, four one-to-one communication phases that substitute for each all-to-all communication phase, a 5D hypercube will have, in normal conditions, five such phases, and on in like manner. The example of FIG. 2 discloses a complete 4D hypercube 200 in which four communication phases 202, 204, 206, and 208, take place. By definition, a complete 4D hypercube comprises 16 nodes, or 24 nodes.

Figure 2:
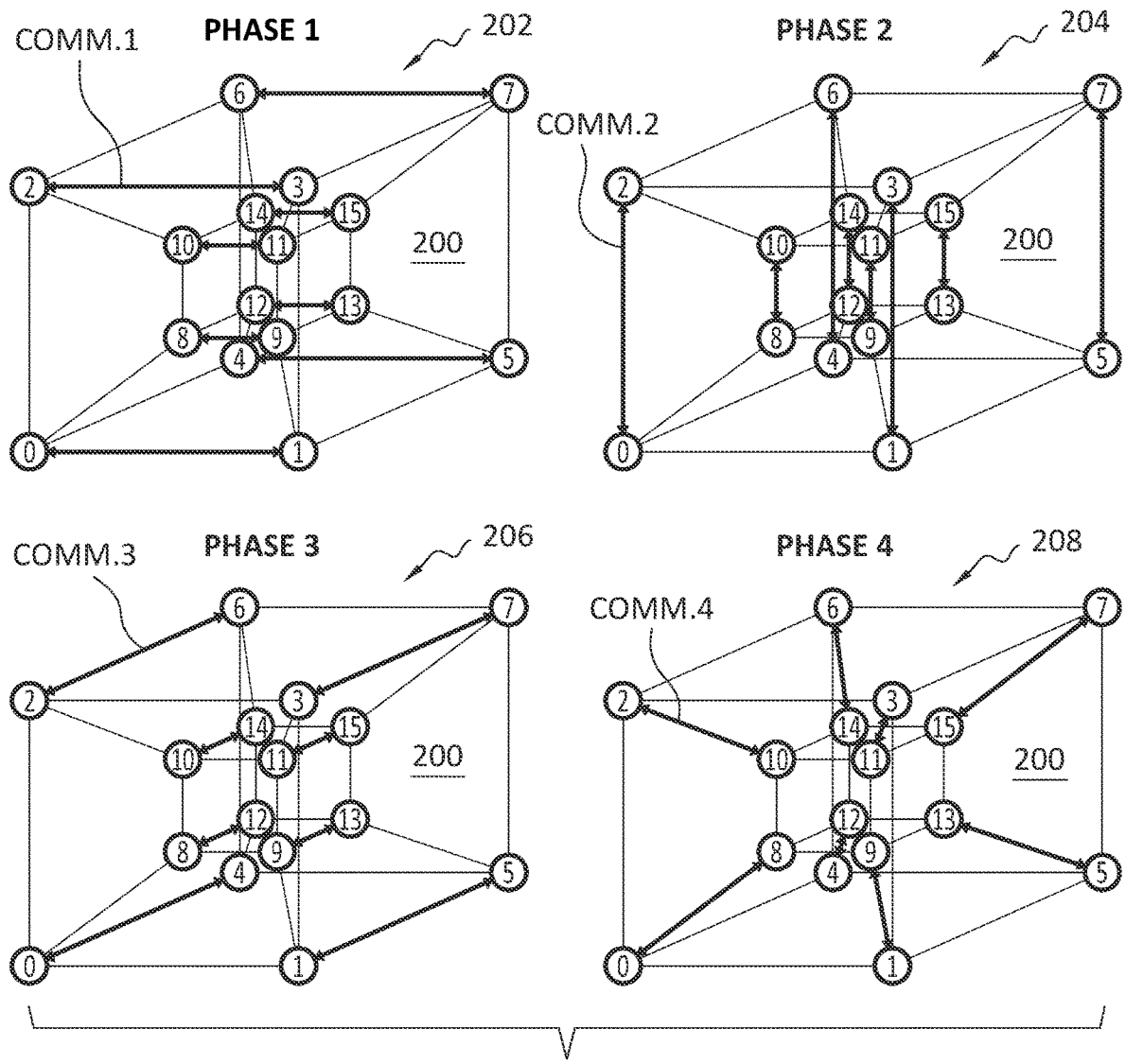
FIG. 2 discloses aspects of various communication phases of a 4D (four dimensional) hypercube, according to one embodiment.

The first four communication phases 202-208 of the example in FIG. 2 occur over a channel dubbed Hamming-1, as each node communicates only with nodes at Hamming distance 1 in binary. For example, Node 2 (0010) communicates, sequentially, with nodes 3 (0011), node 0 (0000), node 6 (0110), and node 10 (1010) as denoted, respectively, by COMM 1, COMM 2, COMM 3, and COMM 4. Notice that the selection of a node to send a message to, and receive a message from, is defined by a XOR bitwise operation at bits 1, 2, 3, and 4 (bits italicized), for all nodes, this is the definition of a Hamming-1 channel, that is, a channel where all one-to-one connections are separated by consecutive changes in one single bit at a time.

Generalizing, a Hamming-k channel is a communication channel where all connections are separated by consecutive changes in k bits at a time, from the least significative to the highest significative. In this example, if no node is compromised, then all messages reach all nodes at the end of phase 4, with $16*4(n*\log_2 n$, where n is the number of nodes) messages being sent. The reason for this is that, in every phase, all nodes forward information from previous phases, decreasing total system messages. Therefore, under common circumstances, an embodiment may greatly improve, that is, reduce, communication complexity as compared against the conventional $O(n^2)$ all-to-all communication case.

Figure 3:
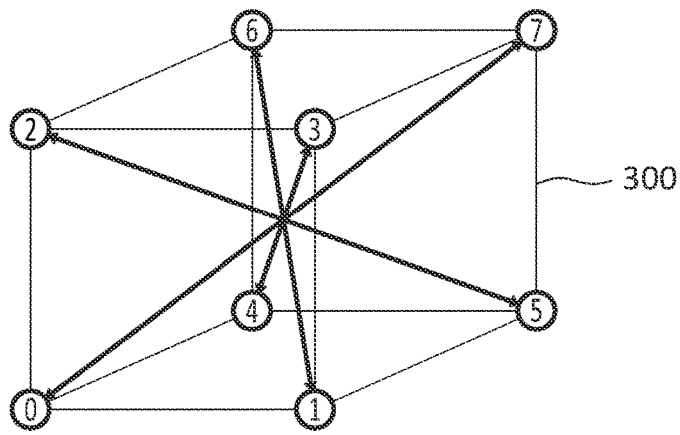
FIG. 3 discloses aspects of Hamming-3 channel communication on a 3D hypercube, according to one embodiment.

With reference now to the example of FIG. 3, there is disclosed Hamming-3 channel communication on a 3D hypercube 300. It is noted that there is only one phase for the Hamming-3 channel on a 3D hypercube 300, as there is only one way to change all three bits of a 3D hypercube 300 node number.

A kD hypercube, where k is he number of dimensions, will have k Hamming channels available, each channel requiring a particular number of phases to complete, corresponding to the equivalent binomial coefficient. Then, the total number of phases of all Hamming channels of a kD hypercube is equal to $k^2$, as the sum of all binomial coefficients over k is $k^2$, meaning that if all nodes go through all phases of all Hamming channels, this is equivalent to all-to-all communication.

In the presence of one or more faulty nodes in a communication system, one or more additional post-phases may be required, to guarantee that all nodes eventually achieve consensus. Note that this post-phase is only called by nodes that did not achieve consensus in the previous phases, and this only occurs in the presence of faulty nodes. In a post-phase, the additional messages will be sent using other Hamming distance channels in sequence. For example, in a 4D, 16-node hypercube, an additional single Hamming-4 post-phase can cope with attacks to any single node. Experiments have shown that 99.27% of all possible attack combinations (4336 of 4368 different combinations) to 5 nodes of a 16-node system are dealt with a post-phase composed of 4 Hamming-3 phases followed by a single Hamming-4 phase.

Also, an embodiment may comprise the use of additional Hamming channel phases to deal with incomplete node structures that do not form a complete hypercube, where the count of nodes is not in the form $2^p$. For example, a system with 20 nodes, using a sequence of communications over channels Hamming-1, Hamming-4 followed by Hamming-3, is resilient to 5 faulty nodes in 99.72% of the cases (15460 out of 15504 combinations), and the same sequence of Hamming channel combinations can deal with 5 faulty nodes in any configuration from 22 to 32 nodes, confirming that adding nodes to an incomplete hypercube also increases the system resiliency to attack.

The inventors have found experimentally that, at least for some dimensions, it is possible to resort to less than $n^2$ phases, where the count of phases is the sum of all phases of all Hamming channels used, and still be resilient to f attacks, when the system has 3f+1 nodes and f represents the number of faulty nodes. For example, a hypercube with 16 nodes (3f+1=16, f=5) is resilient to 100% of the attacks using channels 1, 3, 4 and 1 in sequence, adding up to 13 phases (4+4+1+4), 3 less than $n^2$=16. Of course, only channel 1, with 4 phases, would suffice in the absence of faults, that is, where none of the nodes are faulty.

B.2 Further Discussion

As disclosed herein, an example embodiment comprises a generic method to modify all-to-all broadcast phases of pBFT-based protocols by taking advantage of hypercube topology and Hamming distance channels. A hypercube topology with n nodes using Hamming-1 channel reduces the best-case communication complexity from $O(n^2)$ to $O(n*\log_2 n)$. By reducing this communication complexity, an embodiment may [1] reduce the number of communications that must take place to achieve consensus, [2] may reduce the time required to reach consensus, [3] may reduce the infrastructure needed for communications, while still [4] maintaining a high level of resilience against attacks.

As will be apparent from this disclosure, one or more example embodiments may possess various useful features and aspects, although no embodiment is required to possess any of such features or aspects. The following examples are illustrative, but not exhaustive.

For example, in an embodiment, nodes are logically organized in a hypercube topology and only communicate with the nodes in the same Hamming distance channel for each phase of the communication protocol and, as such, this embodiment differs from traditional approaches that require all-to-all communication at every stage or phase. As another example, in an embodiment, the reorganization of nodes in a hypercube topology promotes message spanning in an optimized way, reducing message complexity in the best-case scenario to $O(n*\log_2 n)$.

An embodiment comprises a method for using Hamming distance communication channels to deal with an incomplete hypercube, that is, a hypercube with less than a full complement of nodes, and to deal with attacks to the nodes, enabling a a gradual increase of communication without resorting to an all-to-all communication mode. In this example embodiment, an additional post-phase may be triggered if the nodes do not reach consensus, with nodes requesting further Hamming distance channel communication, without resorting to all-to-all communication.

As a final example, in an embodiment, the broadcast protocol is split in new phases, each using a different Hamming distance channel. This approach may enable small communication increases to address faulty nodes and incomplete networks, without requiring resort to a steep switch to all-to-all communication.

C. Detailed Discussion of Aspects of One or More Example Embodiments pBFT-based protocol nodes, require, at specific points of the protocol, all-to-all communication, so that the decision of each node is broadcast to all other nodes. In contrast, an embodiment comprises a complete redesign of all-to-all broadcast phases in pBFT-based protocols by exploiting a hypercube topology, in conjunction with Hamming distance communication channels. This approach greatly decreases communication complexity for most in cases, even in the presence of faults or Byzantine attacks, when compared to the current all-to-all in pBFT-based algorithms. Furthermore, an embodiment is generic in the sense that it can be easily ported into any all-to-all BFT protocol and, as such, may be useful in blockchain solutions which often require an underlying BFT protocol solution.

Figure 4:
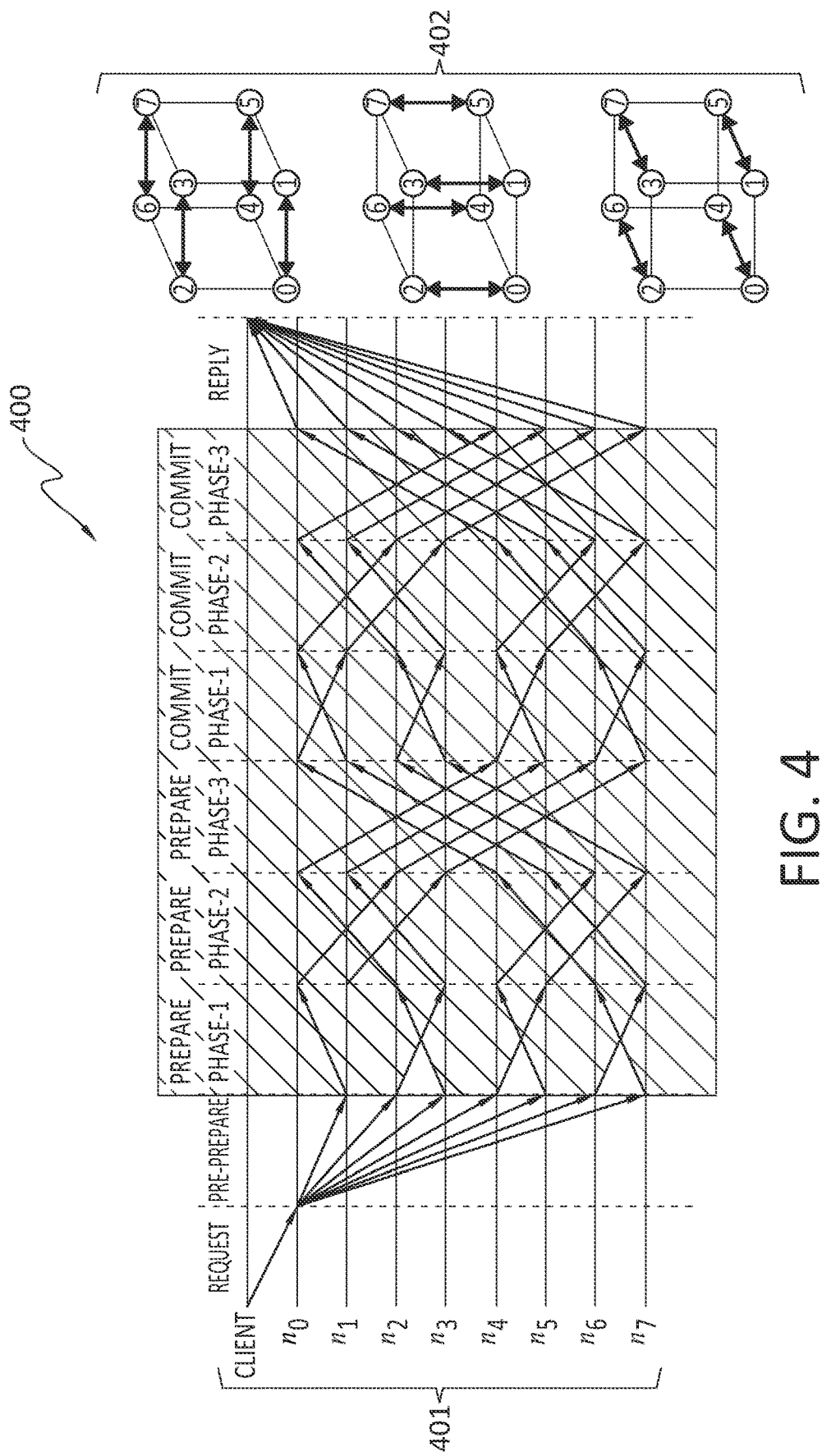
FIG. 4 discloses various phases of a 3D hypercube BFT, according to one embodiment.

With attention now to FIG. 4, an example 400 is disclosed that shows the various phases of an example 3D hypercube BFT. In particular, FIG. 4 discloses, according to one embodiment, the phases of the Hamming channel 3D hypercube without faulty nodes, which replace the single all-to-all 'prepare' and single all-to-all 'commit' phases of the conventional pBFT. In the example of FIG. 4, there are a total of 8 nodes 401, and it is assumed that n0 is the primary node, as in pBFT. In the right side of FIG. 4, there are shown visualizations 402 of a 3D hypercube with 8 nodes and how the nodes share messages for each of the 3 phases. It is noted that, in each phase, the corresponding pair is at Hamming distance 1 of the original node. At each phase, every node relays their accumulated messages to their pairs.

In the absence of faulty nodes, all nodes 401 are in possession of all messages at the end of the last phase, that is, the 'commit phase-3,' and the next stage of the protocol can follow. To deal with the presence of faults or topological attacks, an embodiment comprises a post-phase algorithm that triggers additional Hamming channels to guaranteed non-faulty nodes consensus. It is noted that one of the examples disclosed herein is concerned only with the cases where the faulty nodes fail to send their messages. If a faulty node sends a malicious message, or a faulty node sends an invalid message, those circumstances may be dealt with by the pBFT-based layer of the overlying protocol.

One example embodiment is generic and may work for any pBFT-based protocol that include all-to-all broadcast phases as part of their consensus algorithm. Moreover, the weak-synchronous and asynchronous characteristics of any protocol are completely maintained because the proposed changes work at a lower layer. The following sections address, in turn, a detailed description of the network topology, how each phase of one embodiment behaves-including the post-phases, and complexity analysis.

Finally, and with general reference to FIG. 4, it can be seen that at various phases, the nodes 401 broadcast only to one other node, rather than to all other nodes as in conventional approaches. By way of illustration, as part of 'prepare phase-2,' it can be seen that node $n^2$ broadcasts only to node n0.

C.1 Definitions i. Let n be the number of nodes in a pBFT-based protocol.

ii. Let k=⌈$\log_2$ n⌉ be the dimension of a hypercube that accommodates a topological representation of the n nodes. For a complete hypercube, n should be in the form $2^k$, but an embodiment works with any n≥4.

iii. Let $\mathcal{R}_n$ ={0, 1, . . . , n−1} be the collection of the n nodes, numbered from 0 to n−1. In principle, the numbering of each node is arbitrary, but there is the option to number nodes according to specific criteria, for example: geographic proximity, expected network lag, device capability, and likelihood of failure.

iv. Let $\mathcal{H}c_k(i)$, or Hamming Channel-i, be a list of integers j, sorted in ascending order, such that 0<j<$2^k$, and each j has exactly i digits 1 on its binary representation. $Hc_k(i)$ represents all possible one-to-one communications for the $i^{th}$ Hamming Distance Channel in k dimensions. It is noted that for any hypercube in k-dimensions, there are k sets of $Hc_k(i)$, with $$0 < i \leq k \text{ and } |\mathcal{H}c_k(i)| = \binom{k}{i}.$$

v. Let $\mathcal{H}s_k = \{Hc_k(i_1), Hc_k(i_2), \ldots, Hc_k(i_n)\}$ be the ordered sequence of Hamming Channels to be employed in the hypercube of k-dimensions. The exact sequence to be followed is a parameter of one example embodiment, but all examples disclosed herein use $Hc_k(1)$ as the first element of the sequence, unless indicated otherwise, without any loss of generality. The sequence should be such that eventually all connections are used, but preliminary experiments have shown that some sequences are better than others in diminishing the effect, and probability, of topological attacks. Also, other experiments have shown that there are cases where it is possible to order the sequence, sometimes with repetitions and without including all connections, in a way that it has less than $O(n^2)$ complexity and still attend to pBFT-based protocol requirements. These alternatives could be explored with optimization approaches, for example, to fine-tune an implementation of one example embodiment.

C.1.1 Hamming Channel Hypercube Definition Example
For Example:
  Given n=8, then:
  k=⌈$\log_2 8$⌉=3,
  $R_8$ ={0, 1, 2, 3, 4, 5, 6, 7},
Considering Node 0 (000):
  $\mathcal{H}c_3$ (1)={001, 010, 100}, $Hc_3(2)$={011, 101, 110} and $Hc_3(3)$={111}
  $\mathcal{H}s_k$ ={$Hc_3(1)$, $Hc_3(2)$, $Hc_3(3)$}
... where the chosen order of the sequence for $\mathcal{H}s_k$ is arbitrary and is a parameter in one example embodiment. In some embodiments, it is expected that the ordering could be changed "on the fly."

Figure 5:
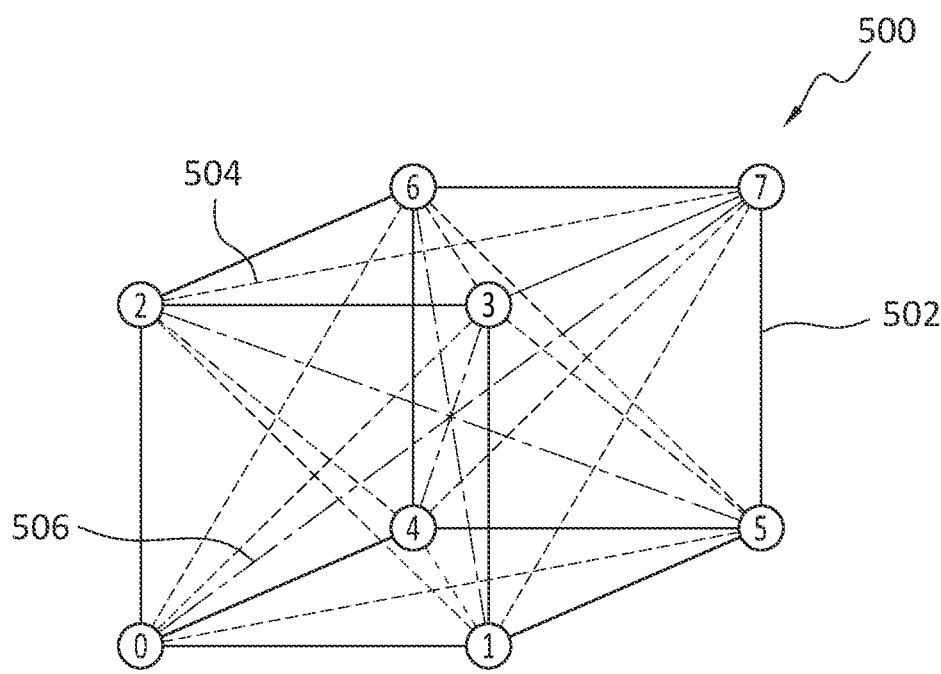
FIG. 5 discloses aspects of a 3D hypercube with all Hamming channels, according to one embodiment.

With attention now to the example of FIG. 5, a 3D hypercube 500, with all Hamming channels, is disclosed. In particular, FIG. 5 discloses the 3D hypercube 500 with $Hc_3(1)$ denoted by the lines 502, $Hc_3(2)$ denoted by the lines 504, and $Hc_3$ denoted by the lines 506. Therefore, following the example of FIG. 5 by looking at the node 0 connections and following the $\mathcal{H}s_3$ order of channels:
  node 0 is connected {1,2, 4}={001, 010, 100}=$\mathcal{H}c_3$ (1) for its first Hamming channel (502);
  node 0 is connected to {3,5,6}={011, 101, 110}=$Hc_3(2)$ for its second Hamming channel (504); and
  node 0 is connected to {7}={111}=$Hc_3(3)$ for its last and third Hamming channel (506).

C.2 Network Topology—Hypercube
Conventional pBFT-based protocols assume a fully connected network topology, where every node is reachable, and messages must be sent to, and from, every node. This assumption enables all-to-all phases, where every node generates, sends, and receives messages to and from every other node in the network. By way of contrast, one example embodiment also assumes a potentially fully connected network, but comprises a virtual organization of the nodes in a hypercube topology to reduce the demands of all-to-all communication requirements.

Figure 6:
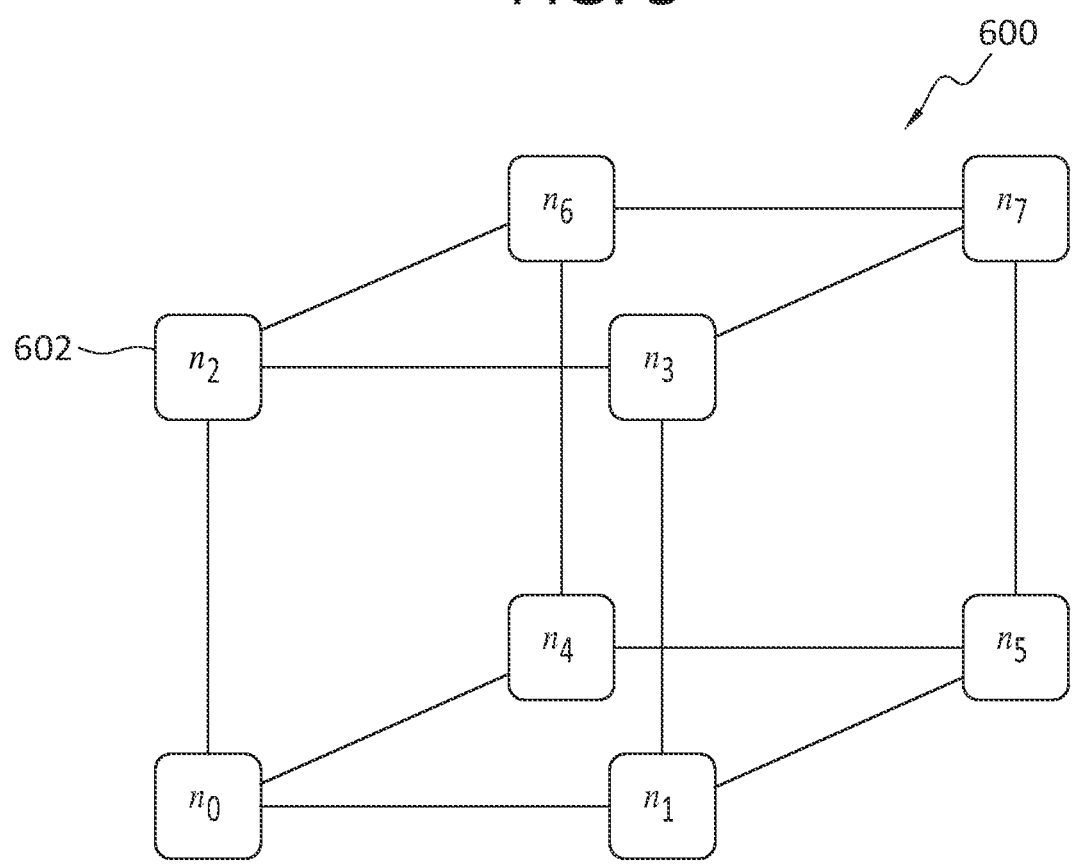
FIG. 6 discloses an example 3D hypercube, according to one embodiment.

With attention now to FIG. 6, there is disclosed a 3D hypercube 600 with 8 nodes 602, numbered from $n_0$ to $n_7$. The nodes are located at the vertices of the hypercube 600 and the 3D edges represent, in a sense, the preferred communication channels between the nodes 602. Per the definitions set forth earlier herein, communication over the edges (for the node no, the pair nodes are $n_1$, $n_2$ and $n_4$) correspond to communications in $Hc_3(1)$. Communication through the faces of the hypercube 600 (for the node $n_0$, the pair nodes are $n_3$, $n_5$ and $n_6$) correspond to $Hc_3(2)$. Finally, communication 'through' the hypercube 600 (for the node no, the pair node is $n_7$), correspond to communications over $Hc_3(3)$.

Figure 7:
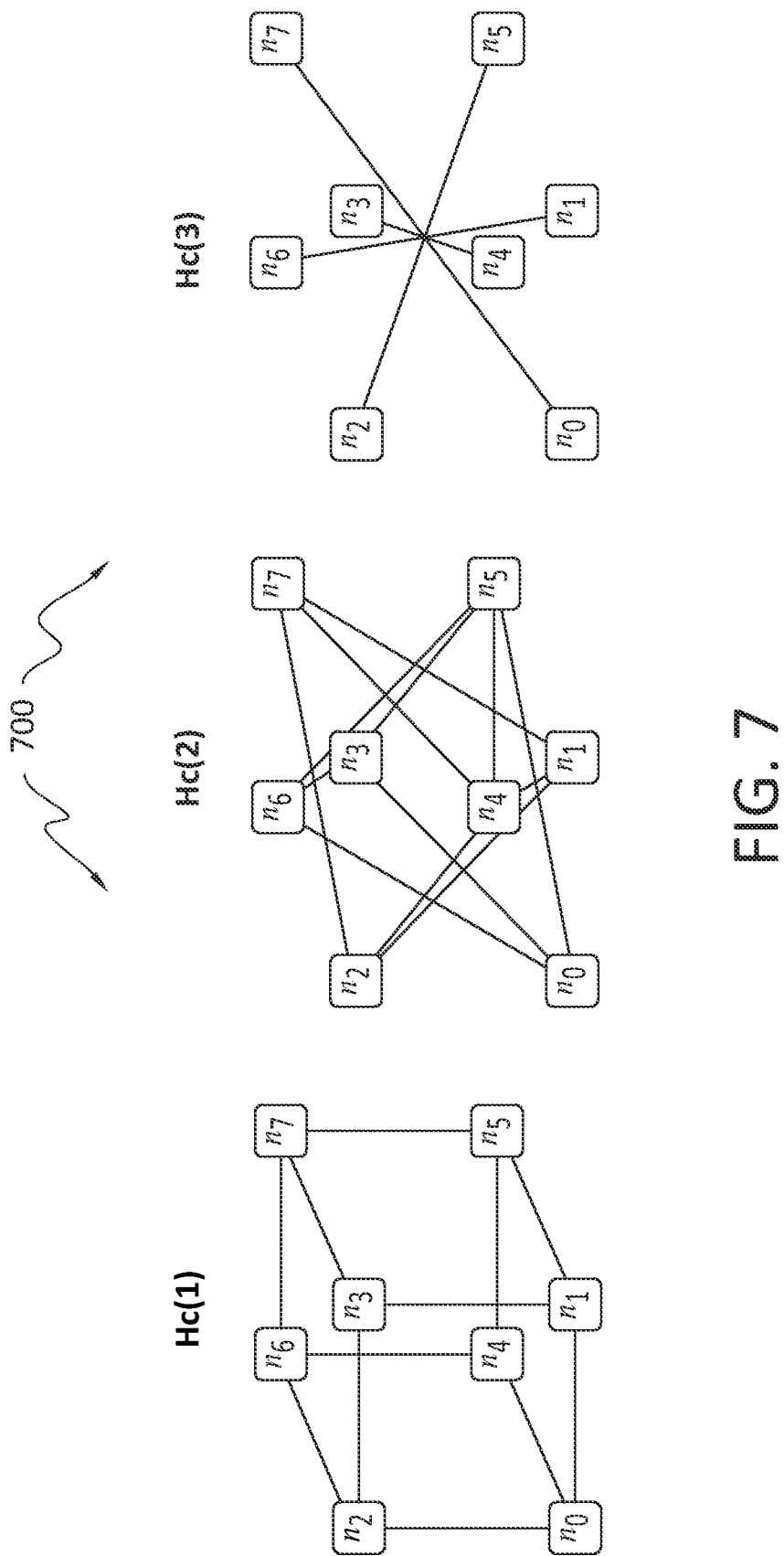
FIG. 7 discloses available Hamming channels for an example 3D hypercube, according to one embodiment.

Turning next to the example of FIG. 7, all the Hamming channels ($\mathcal{H}c_3$ 1 to 3) for a 3D hypercube 700 are disclosed. For a 3D hypercube such as the 3D hypercube 700, the available Hamming channels are: $Hc_3(1)$={001, 010, 100}; $Hc_3(2)$={011, 101, 110}; and, $Hc_3(3)$={111}. It is noted that the node numbers are shown here in binary form so that, for example, 010 refers to node $n_2$. It is noted further that superimposing all the Hamming channels in FIG. 7 yields a fully connected hypercube, but in normal operation, with no faulty nodes, the three phases of $Hc_3(1)$, along with message forwarding, are sufficient to fulfill the communication broadcast requirements. Generalizing, for a hypercube of k dimensions, the k phases of $\mathcal{H}c_k$ (1) are sufficient for all-to-all communication in the absence of faults.

Figure 8:
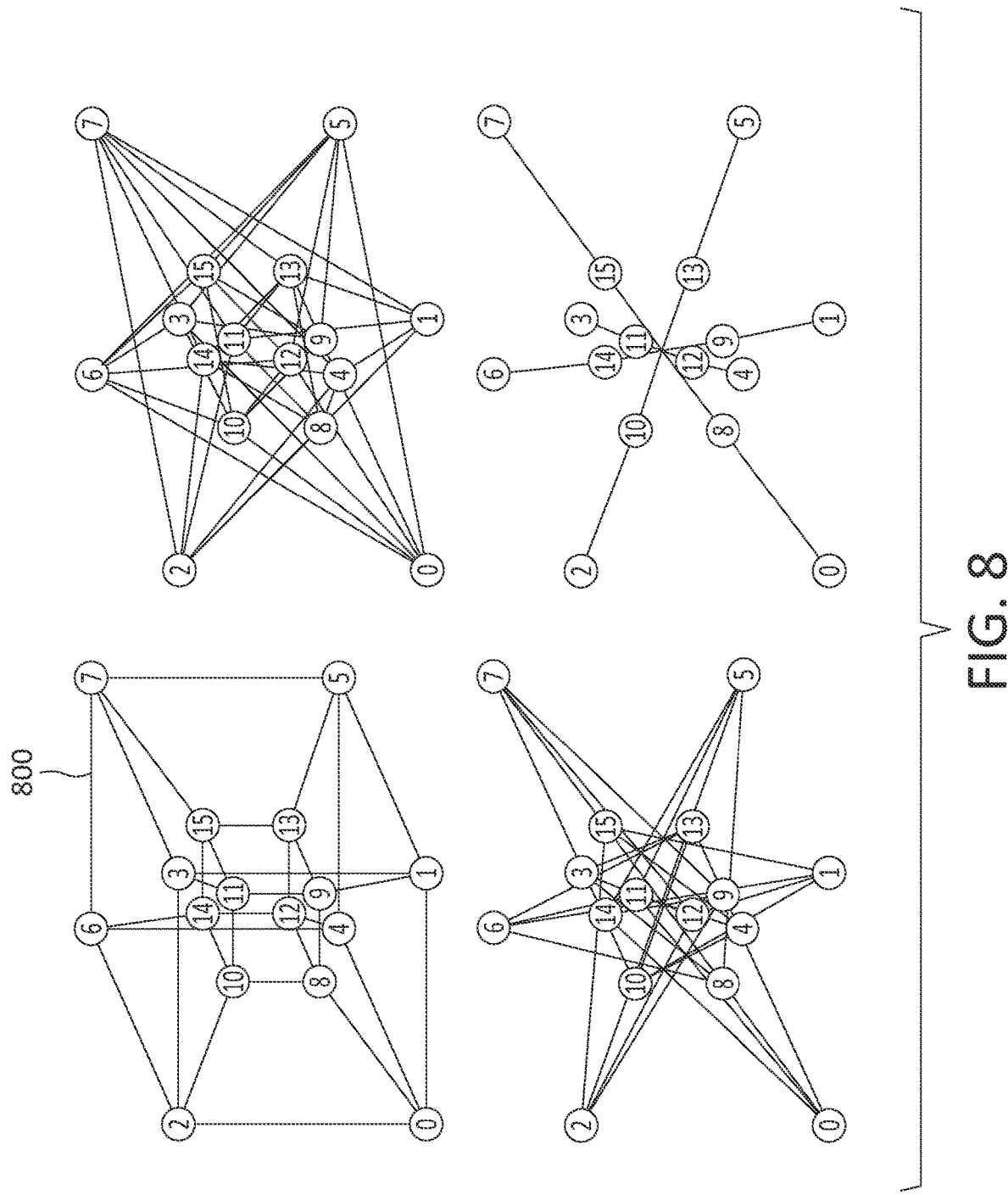
FIG. 8 discloses Hamming channels of a 4-dimension hypercube, according to one embodiment.

For the purposes of facilitating the understanding and visualization of an example embodiment, a number of examples herein use a 3D hypercube, or a cube, but example embodiments work with hypercubes of any dimensions k≥2. For example, FIG. 8 discloses the Hamming channels of a 4D hypercube 800. In particular, for the example 4D hypercube 800, the available Hamming channels disclosed in FIG. 8 are as follows: $\mathcal{H}c_4$ (1)={0001,0010,0100,1000}; $\mathcal{H}c_4$ (2)={0011,0101,0110,1001,1010,1100}; $\mathcal{H}c_4$ (3)={0111,1011,1101,1110}; and, $\mathcal{H}c_4$ (4)={1111}. As in the case of the example in FIG. 7, the node numbers in the aforementioned Hamming channels of the 4D hypercube 800 are shown in binary form.

C.3 Example Protocol Phases of One Embodiment
The Hamming channel hypercube of one example embodiment replaces the all-to-all communication phases of pBFT-based protocols with a sequence of one-to-one communications and message forwarding using a hypercube topology and Hamming distance channels. In one embodiment, the method requires that every node is reachable but does not resort to all-to-all communications at any point, and increases the need for messages smoothly and slowly, relative to the need for messages increases in an all-to-all approach.

pBFT-based protocols have 4 distinct phases, as discussed earlier in connection with FIG. 1, where 2 of these phases, that is, the 'Prepare' and 'Commit' phases, require all-to-all communication. In a Hamming channel hypercube according to one embodiment, each one of these two phases are broken down into k phases, using $\mathcal{H}c_k$ (1). In the absence of faulty nodes, all nodes will have copies of all other node messages, and the protocol can move forward. If there are faulty nodes, then some of the nodes may not have the minimum number of messages (2*f+1, where f is the maximum number of faulty nodes that the protocol accommodates) necessary to move forward with the protocol, so that these nodes, and only these nodes, require additional rounds of post-phases until all of them become in possession of at least 2*f+1 messages.

C.3.1 First Hamming Channel Phases
The initial phases are derived from the first element of $\mathcal{H}s_k$, in all examples presently under consideration using, for simplicity and without any loss of generality, $\mathcal{H}c_k$ (1), but the order of Hamming channels to use in any implementation is a parameter of an embodiment. At each phase of the first element of $\mathcal{H}\mathcal{S}_k$, every node sends its payload to a pair node, waits for the payload of the pair node, and moves to the next phase of the same channel until all payloads are sent and received. The example pseudocode 900 in FIG. 9 exemplifies how, in one embodiment, each node could behave.

In the example of FIG. 9, if there are no faulty nodes, then all nodes would have the messages necessary to move to the next step of the pBFT-based protocol because they are logically fully connected. This way, the all-to-all prepare and commit phases of pBFT-based protocols are, in one embodiment, replaced, if $\mathcal{H}c_k(1)$ is used, by k one-to-one phases, and if there is no faulty node between the nodes, then the communication is completed.

Figure 10:
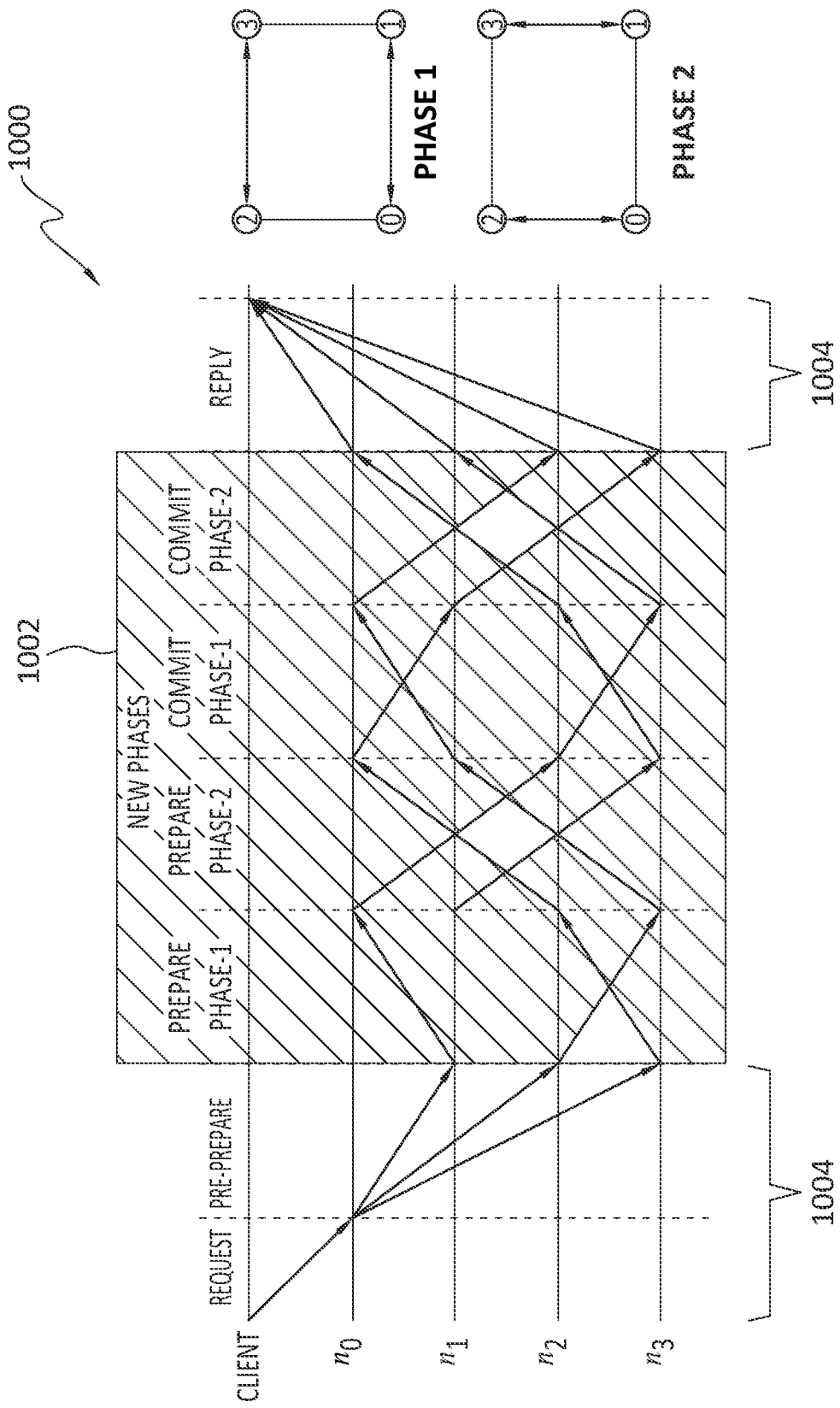
FIG. 10 discloses new phases in a 2D hypercube, according to one embodiment.

With reference now to FIG. 10, an example of a 2D hypercube 1000 is disclosed, using $\mathcal{H}c_k(1)$ for the first phases, without a faulty node, and assuming, as per pBFT-based protocol definitions, that no is the primary node. Various phases 1002 according to one embodiment are shown and include: 'prepare phase-1,' 'prepare phase-2,' 'commit phase-1,' and 'commit phase-2.' In an embodiment, these phases 1002 may be employed together with conventional phases 1004, that is, phases used in a pBFT approach.

C.3.2 Example Post-Phases

In the presence of faulty nodes, specific topological failures may affect the system different which will lead non-faulty nodes to never reach consensus. With that in mind, one embodiment comprises a post-phase algorithm that is called only by nodes that did not reach the required minimum number of messages to declare consensus.

During execution of the post phase, according to one embodiment, these nodes will (1) verify what node is their pair in the next phase of the next Hamming channel available, (2) request a message from the pair, (3) after receiving a reply, verify if they met the minimum number of messages required and, if not, (4) move the next phase of the Hamming channel or to the next Hamming channel, until the minimum number of messages is reached or if there are no more Hamming channels available. Note that any other node that did not require a post-phase, can move forward into the next stages of the protocol.

Figure 11:
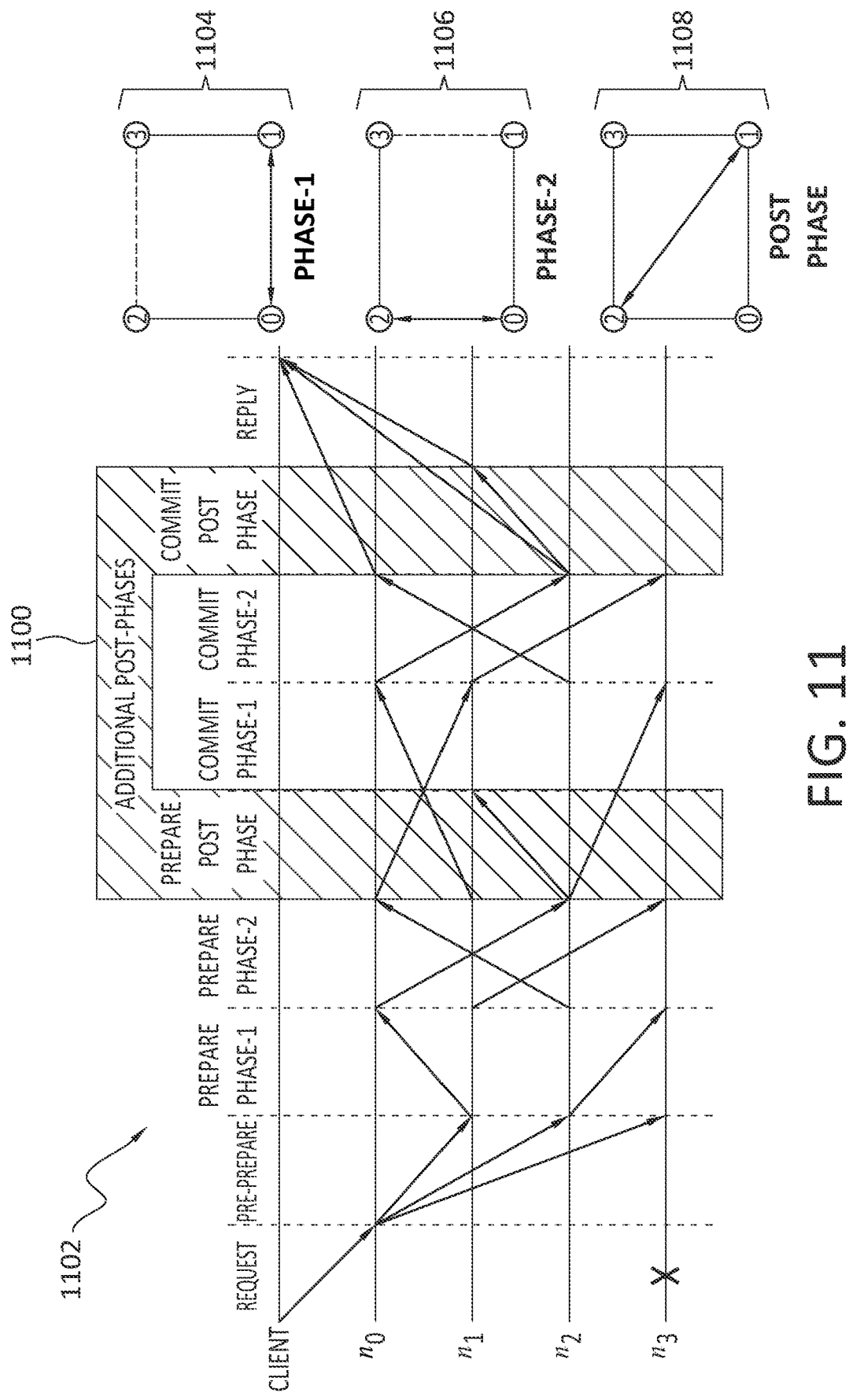
FIG. 11 discloses an example post-phase of a 2D hypercube with a faulty node 3, according to one embodiment.

Turning next to FIG. 11, example post-phase(s) are disclosed at 1100. In the example of FIG. 11, a 2D hypercube 1102 is disclosed, with a faulty node 3. After the initial phases, only node 1 failed to meet the minimum requirement of 3 messages, and accordingly requests a post-phase from node 2, that, in its turn, sends its payload to 1. This post-phase is later committed before node 1 sends a final reply to the client.

In more detail, in each phase, every node sends the information it has at the moment. Thus, prior to phase 1 (1104) (in which Node 0 communicates with Node 1): Node 0 has info on 0; Node 1 has info on 1; and Node 2 has info on 2. After phase 1 (1104) (after Node 0 has communicated with Node 1): Node 0 has information on 0 and 1; Node 1 has information on 0 and 1; and, Node 2 has information on 2. Then, after phase 2 (1106): Node 0 has information on 0, 1 and 2; Node 1 has information on 0 and 1; and, Node 2 has information on 0, 1 and 2. Because Node 0 and Node 2 have each received 3 messages, but Node 1 has only received 2 messages, Node 1 needs more information and accordingly requests an additional phase, the post-phase 1108, so as to obtain the additional needed information.

Next, FIG. 12 discloses example pseudocode, according to one embodiment, for post-phase request and response.

The pseudocode 1200 in FIG. 12, indicates a node requesting data for its post-phase. It is noted that the pairing node in the post-phase is only requested to send its payload unless the pairing node is also missing messages after the initial phases.

C.3.3 Example of Message Forwarding Dynamics for 3D Hypercube

This section provides details concerning the message forwarding dynamics in the Hamming channel hypercube according to one example embodiment. To better understand the dynamics of message forwarding in each phase, consider an example for a 3D hypercube without any faulty nodes.

Let n: { } represent the set of messages for node n in each phase of $\mathcal{H}c_3(1)$ communication in the 3D hypercube. See the example of FIG. 8 for a visual reference of the one-to-one communication phases of $Hc_3(1)$ in a 3D hypercube.

Let $\mathcal{R}=\{0, \ldots, 7\}$ be the set of all nodes.
Initial state: every node has its own status:
0: {0}, 1: {1}, 2: {2}, 3: {3}, 4: {4}, 5: {5}, 6: {6}, 7: {7}
After the first phase of $Hc_3(1)$, (001), every node has 2 messages:
0: {0, 1}, 1: {0, 1}, 2: {2, 3}, 3: {2, 3}, 4: {4, 5}, 5: {4, 5}, 6: {6, 7}, 7: {6, 7}
After the second phase of $Hc_3(1)$, (010), every node has 4 messages:
0: {0, 1, 2, 3}, 1: {0, 1, 2, 3}, 2: {0, 1, 2, 3}, 3: {0, 1, 2, 3},
4: {4, 5, 6, 7}, 5: {4, 5, 6, 7}, 6: {4, 5, 6, 7}, 7: {4, 5, 6, 7}
After the third phase of $Hc_3(1)$, (100), every node has all messages:
0: {0, 1, 2, 3, 4, 5, 6, 7}, 1: {0, 1, 2, 3, 4, 5, 6, 7}, 2: {0, 1, 2, 3, 4, 5, 6, 7}, 3: {0, 1, 2, 3, 4, 5, 6, 7},
4: {0, 1, 2, 3, 4, 5, 6, 7}, 5: {0, 1, 2, 3, 4, 5, 6, 7}, 6: {0, 1, 2, 3, 4, 5, 6, 7}, 7: {0, 1, 2, 3, 4, 5, 6, 7}

As each node sends one message in each of the 3 phases, in total there are 8*3, or $n*\log_2 n$, messages sent. Also, each node can forward its message on the next phase as soon as it has received the single message of the previous phase, without further delay.

Next, consider the same 3D hypercube with one faulty node at node 7. Initial state: every node has its own status:
0: {0}, 1: {1}, 2: {2}, 3: {3}, 4: {4}, 5: {5}, 6: {6}, 7: { }
After the first phase of $Hc_3(1)$, (001), there is:
0: {0, 1}, 1: {0, 1}, 2: {2, 3}, 3: {2, 3}, 4: {4, 5}, 5: {4, 5}, 6: {6}, 7: { }
After the second phase of $\mathcal{H}c_3(1)$, (010), there is:
0: {0, 1, 2, 3}, 1: {0, 1, 2, 3}, 2: {0, 1, 2, 3}, 3: {0, 1, 2, 3},
4: {4, 5, 6}, 5: {4, 5}, 6: {4, 5, 6,}, 7: { }
After the third phase of $Hc_3(1)$, (100), each node has the following messages:
0: {0, 1, 2, 3, 4, 5, 6}, 1: {0, 1, 2, 3, 4, 5}, 2: {0, 1, 2, 3, 4, 5, 6}, 3: {0, 1, 2, 3},
4: {0, 1, 2, 3, 4, 5, 6}, 5: {0, 1, 2, 3, 4, 5}, 6: {0, 1, 2, 3, 4, 5, 6}, 7: { }

With 8 nodes, the maximum number of faulty nodes is $$f = \left\lfloor \frac{8-1}{3} \right\rfloor = 2,$$

and each node needs, at least, 2*f+1=5 messages to move forward, according to pBFT protocol requirements, then only node 3 requests a post-phase.

C.3.4 Example Payload Dynamics

Given the fact that, in an embodiment, communication is sequential and that messages received in previous phases are forwarded in the next phase, then the size of the payloads increases monotonically from the first phase to the last phase of the corresponding Hc in use. This means that, in an embodiment, the nodes may also be organized in a way where the connections used in the last phases of the first $\mathcal{H}c_k$ of $\mathcal{H}s_k(\mathcal{H}c_k(1)$ in the disclosed examples) are also the ones with better throughput, of all the available alternatives. This may be a useful alternative approach that could be implemented if the size of the payloads is an issue in an embodiment.

C.4 Complexity Analysis

Some embodiments may be considered as being divided into two distinct cases which are discussed below to illustrate a complexity analysis according to an embodiment. In particular, the first, best, case represents the standard operations without any failures or topological attacks which will never trigger a post-phase from any node. During this phase, only $\mathcal{H}c_k(1)$ is required. The second case occurs when a node fails to reach consensus and needs to move into a post-phase that will trigger subsequent Hamming channels until consensus is reached.

It is noted that as disclosed herein, in a system with n nodes, a node will send $$|\mathcal{H}c_k(i)| = \binom{k}{i}$$

messages when using Hamming channel i, where k=$\lceil \log_2 n \rceil$, and both n and k are integers. As a reminder, $|\mathcal{H}c_k(i)|$ represents the communication for one node only. The first case may be relatively simple to analyze and occurs only using $\mathcal{H}c_k(1)$. Replacing it in the equations results in the following:

$$|\mathcal{H}c_k(1)| = \binom{k}{i} = \frac{k!}{1!(k-1)!} = k = \lceil \log_2 n \rceil$$

Considering the entire system with n nodes, each node will send $\lceil \log_2 n \rceil$ messages, and O(n*logn) message complexity may be inferred. Thus, an embodiment provides a significant decrease when compared to the standard $O(n^2)$ from all-to-all communications in pBFT-based protocols.

The second case mentioned above is less straightforward, as the number of subsequent Hamming channels calls diverges depending on the topological attack or failures. The formula can be extended to account for all Hamming channels and will equal $$\sum_{i=1}^{k} \binom{k}{i}.$$

Assuming the worst possible case, all nodes will only reach consensus after using all Hamming channels available. However, this value is bounded by $n^2$ as per definition, since an embodiment does not create more connections than a fully connected hypercube already has. The same is true for the lower-bound as only one Hamming channel will be needed, per the earlier analysis of the first case. Thus, in an embodiment, the worst-case scenario incurs a complexity of:

$$O(n*\log n) \le O\left(\sum_{i=1}^{\log n} \binom{\log n}{i}\right) \le O(n^2).$$

It may be expected that, in an embodiment, a post-phase is not triggered often as the hypercube topology and Hamming channel order can be reconfigured for every execution, decreasing the likelihood of topological attacks. Therefore, it may be expected that for most cases:

$$O(n*\log n) \approx O\left(\sum_{i=1}^{\log n} \binom{\log n}{i}\right).$$

C.5 Incomplete Hypercubes

Following is a brief discussion on alternatives strategies to deal with incomplete hypercubes. In general, incomplete hypercubes refer to node collections $\mathcal{R}_n$ where the number n of nodes is not in the form $2^k$. These incomplete hypercubes are more prone to topological attacks, as the nodes numbered from $2^{k-1}$ up to n have less pairs in the Hamming channels. The closer n gets to $2^k$, the less effective the topological attacks are.

In various embodiments, incomplete hypercubes can be hardened in at least three ways:
1. add more nodes to the hypercube—each additional node increases the number of Hamming Channels available, and consequently additional relay pathways, for each node beyond $2^{k-1}$;
2. remove nodes from the hypercube-if a hypercube has a small number of nodes exceeding $2^{k-1}$, then removing these nodes will reduce the effectiveness of topological attacks; and
3. select a favorable ordering of Hamming channels for $\mathcal{H}s_k$—the nodes beyond $2^{k-1}$ will have less Hamming channels pairs in the smaller channels and more in the middle channels and beyond.

By way of illustration, a hypercube with 10 nodes is particularly sensitive to topological attacks. With a well-devised topological attack compromising 3 nodes, the maximum the protocol accommodates, at least one node may have to go through almost all phases, depending on the ordering of the Hamming channels.

Assuming uniform probability between the attacks, the following illustrative examples are provided:

Case 1
   If $\mathcal{H}s_4 = \{\mathcal{H}c_4(1), \mathcal{H}c_4(2), \mathcal{H}c_4(4), \mathcal{H}c_4(3)\}$, then 16,67% of attacks (20 out of 120 possible attacks) will force at least one node to use the last channel $\mathcal{H}c_4(3)$; and Case 2
   but if $\mathcal{H}s_4 = \{\mathcal{H}c_4(4), \mathcal{H}c_4(1), \mathcal{H}c_4(2), \mathcal{H}c_4(3)\}$, then only 15% of the attacks (18 out of 120 possible attacks) will force at least one node use the last channel $\mathcal{H}c_4(3)$.

Adding just one more node to the collection, so that 11 nodes are available, then using the ordering of Case 1, only 1 attack out of 165—there are more attack combinations as there are more nodes to attack—will force a node use the last Hamming channel. Using the ordering of Case 2, no attack to 3 nodes will force a node to use the last Hamming channel.

D. Example Methods

Figure 13:
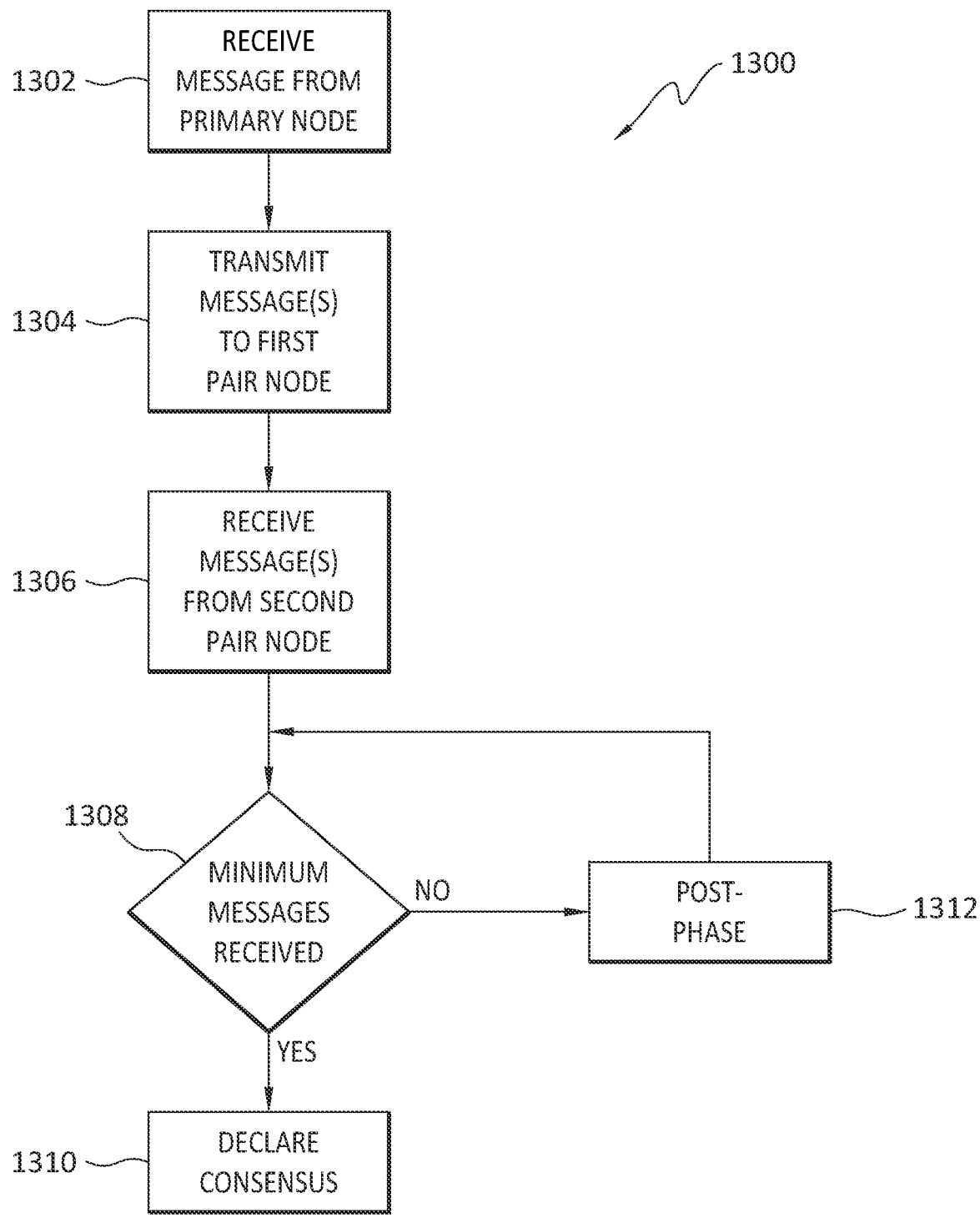
FIG. 13 discloses an example method, according to one embodiment.

It is noted with respect to the disclosed methods, including the example method of FIG. 13, which applies to the example of a 2D hypercube, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 13, a method according to one example embodiment is denoted at 1300. In an embodiment, the method 1300 may be performed as part of a pBFT (practical Byzantine Fault Tolerant) protocol in a communication network that comprises a group of nodes which may be modeled by a hypercube.

The example method 1300 may begin with receipt 1302, by each node of a group of nodes a message from a primary node that is a member of the group of nodes. The message may indicate a request by a client that the nodes attempt to produce a consensus as to some action to be taken with respect to the communication network. Each of the nodes may then transmit 1304 a message to a respective first pair node, and also receive 1306 a message from a respective second pair node.

After each iteration of transmitting 1304 and receiving 1306, a check 1308 may be performed to determine if each of the nodes has received a minimum number of messages needed for the consensus. If so, the nodes may declare 1310 a consensus by transmitting respective replies to the client. On the other hand, any node(s) lacking the minimum number of messages needed for consensus may initiate a post-phase process 1312 that may, in an embodiment, be performed iteratively until the check 1308 reveals that the node, or those nodes, have accumulated the minimum number of messages needed for consensus, at which point the method 1300 may advance to stage 1310.

E. Further Example Embodiments

Following are some further example embodiments. These are presented only by way of example and are not intended to limit the scope of this disclosure in any way.

Embodiment 1. A method, comprising: receiving, by each node in a group of nodes that is organized in a logical hypercube topology, a message from a primary node that is a member of the group of nodes; when none of the nodes in the group of nodes are faulty, for each of 'n' prepare phases and 'n' commit phases of a communication protocol, where 'n' is an integer that is equal to, or greater than, 1: transmitting, by each node to only a first respective pair node, a first group of one or more messages accumulated by the node; receiving, by each node from only a second respective pair node, a second group of one or more messages accumulated by the second respective pair node; and wherein after the 'n' prepare phases and 'n' commit phases have been completed, each of the nodes has accumulated at least a minimum number of total messages to declare consensus; and after the 'n' prepare phases and 'n' commit phases have been completed, transmitting, by each node to a client, a reply.

Embodiment 2. The method as recited in any preceding embodiment, wherein the logical hypercube topology comprises an 'n' dimensional hypercube.

Embodiment 3. The method as recited in any preceding embodiment, wherein the replies indicate a consensus of the nodes regarding an aspect of a communication network modeled by the logical hypercube topology.

Embodiment 4. The method as recited in any preceding embodiment, wherein the total messages accumulated by any of the nodes is no more than 2n total messages.

Embodiment 5. The method as recited in any preceding embodiment, wherein when one of the nodes is a faulty node that has not transmitted any messages, only a node without the minimum number of total messages, calls a post-phase that is either a prepare post-phase, or a commit post-phase.

Embodiment 6. The method as recited in embodiment 5, wherein during execution of the post-phase, the node that has not accumulated the minimum number of total messages performs operations comprising: verifying which node is a pair node in a next phase of a next Hamming channel available; requesting a message from that pair node; and after receiving a reply from the pair node, verifying if the minimum number of total messages has been accumulated and, if not, moving to a next phase of the Hamming channel or moving to a next Hamming channel, until the minimum number of total messages has been accumulated, or there are no more Hamming channels available.

Embodiment 7. The method as recited in any preceding embodiment, wherein each node communicates only with nodes in a same Hamming distance channel for each prepare phase and each commit phase of the communication protocol.

Embodiment 8. The method as recited in any preceding embodiment, wherein when no nodes are faulty, a message complexity for a communication network modeled by the logical hypercube topology is no more than $O(n*\log_2 n)$.

Embodiment 9. A pBFT (practical Byzantine Fault Tolerant) protocol comprising the method as recited in any preceding embodiment, and wherein the primary node transmits its message after receipt, by the primary node, of a request from a client.

Embodiment 10. The method as recited in any preceding embodiment, wherein the logical hypercube topology comprises an incomplete hypercube, and the incomplete hypercube is hardened by either adding one or more nodes to the incomplete hypercube, or removing one or more nodes from the hypercube.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of the disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 14:
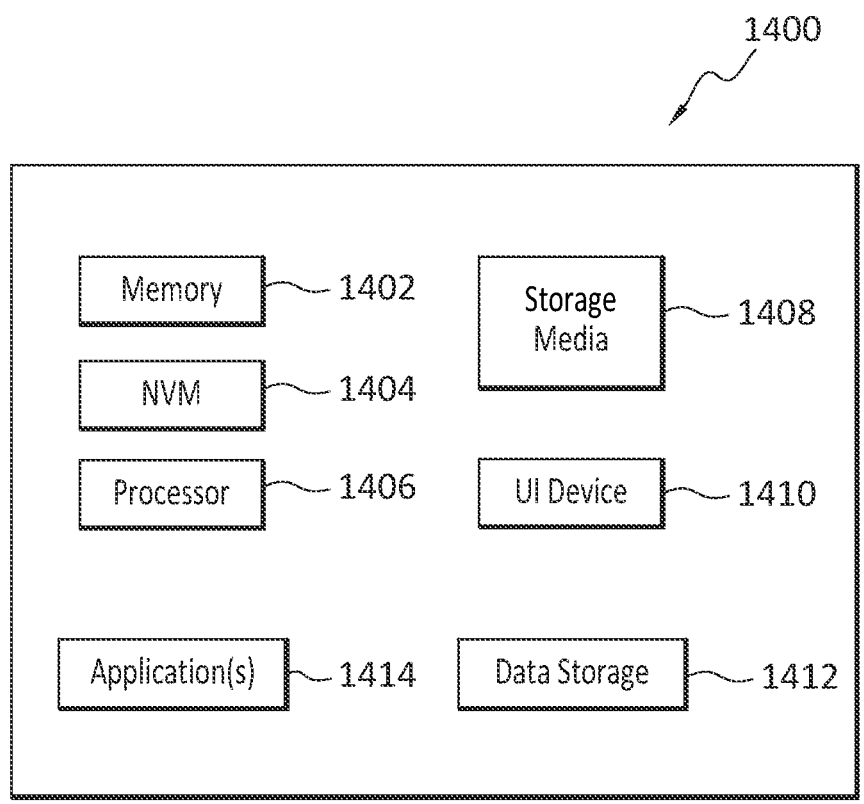
FIG. 14 discloses aspects of an example computing entity configured and operable to perform any of the disclosed methods, processes, and operations.

With reference briefly now to FIG. 14, any one or more of the entities disclosed, or implied, by FIGS. 1-13, and/or elsewhere herein, may take the form of, or include, or be implemented on, or hosted by, a physical computing device, one example of which is denoted at 1400. As well, where any of the aforementioned elements comprise or consist of a virtual machine (VM), that VM may constitute a virtualization of any combination of the physical components disclosed in FIG. 14.

In the example of FIG. 14, the physical computing device 1400 includes a memory 1402 which may include one, some, or all, of random access memory (RAM), non-volatile memory (NVM) 1404 such as NVRAM for example, read-only memory (ROM), and persistent memory, one or more hardware processors 1406, non-transitory storage media 1408, UI device 1410, and data storage 1412. One or more of the memory components 1402 of the physical computing device 1400 may take the form of solid state device (SSD) storage. As well, one or more applications 1414 may be provided that comprise instructions executable by one or more hardware processors 1406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The disclosed embodiments are to be considered in all respects only as illustrative and not restrictive. All changes which come within the meaning and range of equivalency of the claims are to be embraced within their scope.

What is claimed is:

1. A method, comprising:
receiving, by each node in a group of nodes that is organized in a logical hypercube topology, a message from a primary node that is a member of the group of nodes;
when none of the nodes in the group of nodes are faulty, for each of 'n' prepare phases and 'n' commit phases of a communication protocol, where 'n' is an integer that is equal to, or greater than, 1:
transmitting, by each node to only a first respective pair node, a first group of one or more messages accumulated by the node performing the transmitting;
receiving, by each node from only a second respective pair node, a second group of one or more messages accumulated by the second respective pair node; and
wherein after the 'n' prepare phases and 'n' commit phases have been completed, each of the nodes has accumulated at least a minimum number of total messages to declare consensus; and
after the 'n' prepare phases and 'n' commit phases have been completed, transmitting, by each node to a client, a reply.

2. The method as recited in claim 1, wherein the logical hypercube topology comprises an 'n' dimensional hypercube.

3. The method as recited in claim 1, wherein the replies indicate a consensus of the nodes regarding an aspect of a communication network modeled by the logical hypercube topology.

4. The method as recited in claim 1, wherein the total messages accumulated by any of the nodes is no more than $2^n$ total messages.

5. The method as recited in claim 1, wherein when one of the nodes is a faulty node that has not transmitted any messages, only a node without the minimum number of total messages, calls a post-phase that is either a prepare post-phase, or a commit post-phase.

6. The method as recited in claim 5, wherein during execution of the post-phase, the node that has not accumulated the minimum number of total messages performs operations comprising:
  verifying which node is a pair node in a next phase of a next Hamming channel available;
  requesting a message from that pair node; and
  after receiving a reply from the pair node, verifying if the minimum number of total messages has been accumulated and, if not, moving to a next phase of the Hamming channel or moving to a next Hamming channel, until the minimum number of total messages has been accumulated, or there are no more Hamming channels available.

7. The method as recited in claim 1, wherein each node communicates only with nodes in a same Hamming distance channel for each prepare phase and each commit phase of the communication protocol.

8. The method as recited in claim 1, wherein when no nodes are faulty, a message complexity for a communication network modeled by the logical hypercube topology is no more than $O(n*\log_2 n)$.

9. A pBFT (practical Byzantine Fault Tolerant) protocol comprising the method as recited in claim 1, and wherein the primary node transmits its message after receipt, by the primary node, of a request from a client.

10. The method as recited in claim 1, wherein the logical hypercube topology comprises an incomplete hypercube, and the incomplete hypercube is hardened by either adding one or more nodes to the incomplete hypercube, or removing one or more nodes from the hypercube.

11. A non-transitory storage medium having stored therein instructions that are executable by one or more hardware processors to perform operations comprising:
  receiving, by each node in a group of nodes that is organized in a logical hypercube topology, a message from a primary node that is a member of the group of nodes;
  when none of the nodes in the group of nodes are faulty, for each of 'n' prepare phases and 'n' commit phases of a communication protocol, where 'n' is an integer that is equal to, or greater than, 1:
    transmitting, by each node to only a first respective pair node, a first group of one or more messages accumulated by the node performing the transmitting;
    receiving, by each node from only a second respective pair node, a second group of one or more messages accumulated by the second respective pair node; and
  wherein after the 'n' prepare phases and 'n' commit phases have been completed, each of the nodes has accumulated at least a minimum number of total messages to declare consensus; and
  after the 'n' prepare phases and 'n' commit phases have been completed, transmitting, by each node to a client, a reply.

12. The non-transitory storage medium as recited in claim 11, wherein the logical hypercube topology comprises an 'n' dimensional hypercube.

13. The non-transitory storage medium as recited in claim 11, wherein the replies indicate a consensus of the nodes regarding an aspect of a communication network modeled by the logical hypercube topology.

14. The non-transitory storage medium as recited in claim 11, wherein the total messages accumulated by any of the nodes is no more than $2^n$ total messages.

15. The non-transitory storage medium as recited in claim 11, wherein when one of the nodes is a faulty node that has not transmitted any messages, only a node without the minimum number of total messages, calls a post-phase that is either a prepare post-phase, or a commit post-phase.

16. The non-transitory storage medium as recited in claim 15, wherein during execution of the post-phase, the node that has not accumulated the minimum number of total messages performs operations comprising:
  verifying which node is a pair node in a next phase of a next Hamming channel available;
  requesting a message from that pair node; and
  after receiving a reply from the pair node, verifying if the minimum number of total messages has been accumulated and, if not, moving to a next phase of the Hamming channel or moving to a next Hamming channel, until the minimum number of total messages has been accumulated, or there are no more Hamming channels available.

17. The non-transitory storage medium as recited in claim 11, wherein each node communicates only with nodes in a same Hamming distance channel for each prepare phase and each commit phase of the communication protocol.

18. The non-transitory storage medium as recited in claim 11, wherein when no nodes are faulty, a message complexity for a communication network modeled by the logical hypercube topology is no more than $O(n*\log_2 n)$.

19. The non-transitory storage medium as recited in claim 11, wherein the operations are performed as part of a pBFT (practical Byzantine Fault Tolerant) protocol, and wherein the primary node transmits its message after receipt, by the primary node, of a request from a client.

20. The non-transitory storage medium as recited in claim 11, wherein the logical hypercube topology comprises an incomplete hypercube, and the incomplete hypercube is hardened by either adding one or more nodes to the incomplete hypercube, or removing one or more nodes from the hypercube.

* * * * *